US010391680B2

(12) United States Patent
Tsujino et al.

(10) Patent No.: US 10,391,680 B2
(45) Date of Patent: Aug. 27, 2019

(54) METHOD FOR PRODUCING BELT, AND CYLINDRICAL MOLD AND CROSSLINKING APPARATUS USED THEREFOR

(71) Applicant: BANDO CHEMICAL INDUSTRIES, LTD., Kobe-shi, Hyogo (JP)

(72) Inventors: Kouichi Tsujino, Kobe (JP); Hirokazu Sakurai, Kobe (JP); Hisashi Izumi, Kobe (JP); Masaki Miyanishi, Kobe (JP); Yusaku Taoshita, Kobe (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 0 days.

(21) Appl. No.: 16/118,258

(22) Filed: Aug. 30, 2018

(65) Prior Publication Data

US 2018/0370079 A1    Dec. 27, 2018

Related U.S. Application Data

(63) Continuation of application No. PCT/JP2017/000309, filed on Jan. 6, 2017.

(30) Foreign Application Priority Data

Mar. 30, 2016  (JP) .................................. 2016-069531

(51) Int. Cl.
*B29C 33/06* (2006.01)
*B29D 29/00* (2006.01)
(Continued)

(52) U.S. Cl.
CPC .............. *B29C 33/06* (2013.01); *B29C 33/08* (2013.01); *B29C 43/18* (2013.01); *B29D 29/00* (2013.01);
(Continued)

(58) Field of Classification Search
CPC ....... B29C 33/06; B29C 33/065; B29C 33/08; B29C 33/085; B29C 41/04; B29C 41/042;
(Continued)

(56) References Cited

U.S. PATENT DOCUMENTS 2,094,511 A    9/1937  Welch
2,671,244 A *  3/1954  Freedlander ........... B29D 29/10
                                                      264/315
(Continued)

FOREIGN PATENT DOCUMENTS

CN    102354009 A    2/2012
CN    104245279 A    12/2014
(Continued)

*Primary Examiner* — Jeffrey M Wollschlager
(74) *Attorney, Agent, or Firm* — Maschoff Brennan

(57) ABSTRACT

A method include: providing a cylindrical mold made of metal, a shaped structure having a cylindrical shape, a rotation mechanism configured to rotatably support the cylindrical mold, and an electromagnetic induction coil configured to heat the cylindrical mold through electromagnetic induction; setting the shaped structure inside the cylindrical mold; and molding a cylindrical belt slab by heating the cylindrical mold by the electromagnetic induction coil, while the cylindrical mold is rotated by the rotation mechanism and the shaped structure is pressurized from inside and pressed against the cylindrical mold.

11 Claims, 13 Drawing Sheets

(51) Int. Cl.
| | |
|---|---|
| *B29C 33/08* | (2006.01) |
| *B29C 43/18* | (2006.01) |
| *B29D 29/08* | (2006.01) |
| *B29D 29/10* | (2006.01) |
| *B32B 3/30* | (2006.01) |
| *B32B 17/10* | (2006.01) |
| *B32B 25/08* | (2006.01) |
| *F16G 1/28* | (2006.01) |
| *F16G 5/06* | (2006.01) |
| *F16G 5/20* | (2006.01) |

(52) U.S. Cl.
CPC ........... *B29D 29/08* (2013.01); *B29D 29/103* (2013.01); *B32B 3/30* (2013.01); *B32B 17/10779* (2013.01); *B32B 25/08* (2013.01); *F16G 1/28* (2013.01); *F16G 5/06* (2013.01); *F16G 5/20* (2013.01); *B29C 33/085* (2013.01); *B32B 2260/021* (2013.01); *B32B 2262/0261* (2013.01); *B32B 2413/00* (2013.01)

(58) Field of Classification Search
CPC . B29C 41/045; B29C 41/085; B29C 45/0441; B29C 45/2681; B29C 45/5605; B29C 51/22; B29C 51/225; B29C 53/44; B29C 70/32; B29C 70/323; B29C 70/326
See application file for complete search history.

(56) References Cited

U.S. PATENT DOCUMENTS

| | | | | |
|---|---|---|---|---|
| 3,078,205 A * | 2/1963 | Flint, III | ................ | B29C 43/021 156/137 |
| 3,078,206 A * | 2/1963 | Skura | .................... | B29C 43/021 156/140 |
| 3,830,605 A | 8/1974 | Pechacek | | |
| 4,053,547 A * | 10/1977 | Redmond, Jr. | ........ | B29D 29/08 156/137 |
| 4,209,483 A * | 6/1980 | Batchelar | ............. | B29D 29/106 264/159 |
| 4,394,340 A * | 7/1983 | Tarumi | .................. | B29C 41/042 264/219 |
| 4,699,578 A * | 10/1987 | Sumner | ................... | B29C 33/06 264/315 |
| 4,747,812 A * | 5/1988 | Matsuoka | ................. | F16G 5/20 156/138 |
| 5,066,344 A * | 11/1991 | Inami | ..................... | B29D 29/08 156/138 |
| 5,128,091 A * | 7/1992 | Agur | ..................... | B29C 49/0042 264/129 |
| 5,338,497 A * | 8/1994 | Murray | ................... | B29C 33/08 264/257 |
| 5,360,329 A * | 11/1994 | Lemelson | ............... | B21C 23/08 425/143 |
| 5,685,417 A * | 11/1997 | Hasegawa | ............. | B29C 70/086 198/847 |
| 5,833,898 A * | 11/1998 | Dutt | ....................... | B29C 31/041 264/102 |
| 6,470,807 B2 | 10/2002 | Warner | | |
| 7,084,380 B2 * | 8/2006 | Okada | ................. | B29C 35/0272 219/635 |
| 7,679,036 B2 * | 3/2010 | Feigenblum | ............ | B29C 33/06 148/520 |
| 8,657,595 B2 * | 2/2014 | Feigenblum | ............ | B29C 33/06 425/174.8 R |
| 9,370,884 B2 * | 6/2016 | Kuwahara | ............... | B29C 33/08 |
| 10,173,379 B2 * | 1/2019 | Feigenblum | ........ | B29C 35/0805 |
| 2007/0160822 A1* | 7/2007 | Bristow | ................... | B29C 43/02 428/304.4 |
| 2009/0291796 A1 | 11/2009 | Mitsutomi et al. | | |
| 2014/0103562 A1* | 4/2014 | Okubo | ................. | B29D 29/103 264/49 |
| 2014/0296011 A1* | 10/2014 | Yoshida | .................... | F16G 5/08 474/261 |
| 2015/0021798 A1 | 1/2015 | Kimura et al. | | |
| 2015/0076105 A1* | 3/2015 | Sato | ..................... | B65D 1/0261 215/381 |

FOREIGN PATENT DOCUMENTS

| | | | |
|---|---|---|---|
| EP | 2832519 | * | 2/2015 |
| JP | 2010-194958 A | | 9/2010 |
| JP | 2011-213046 A | | 10/2011 |
| WO | 2012/172717 A1 | | 12/2012 |

* cited by examiner

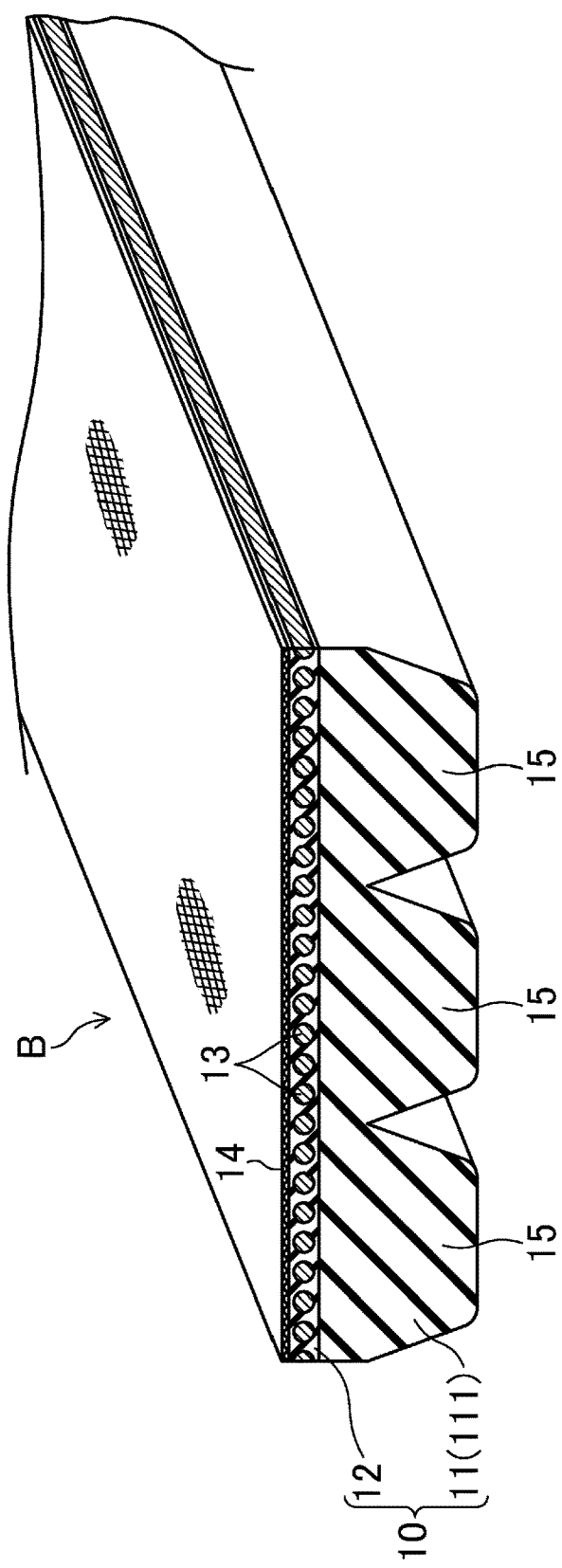

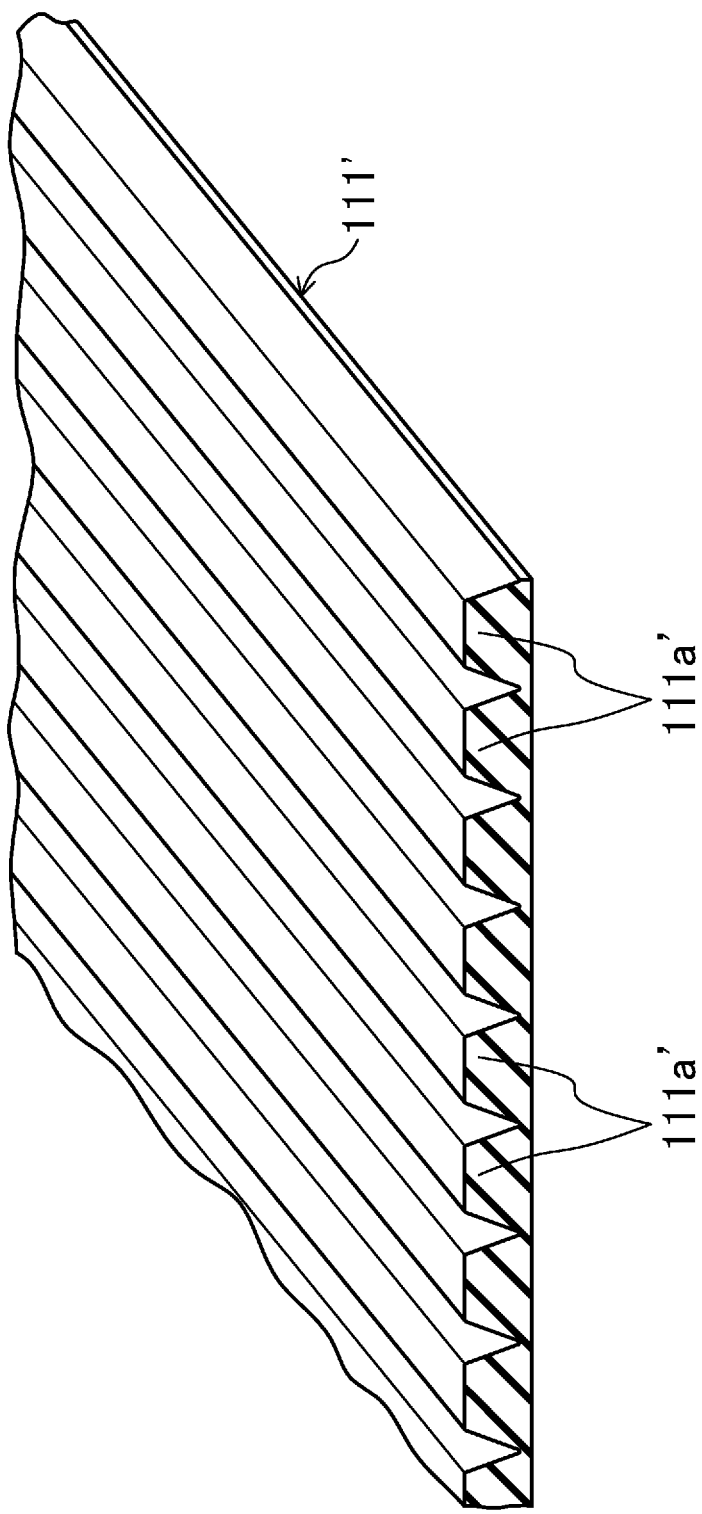

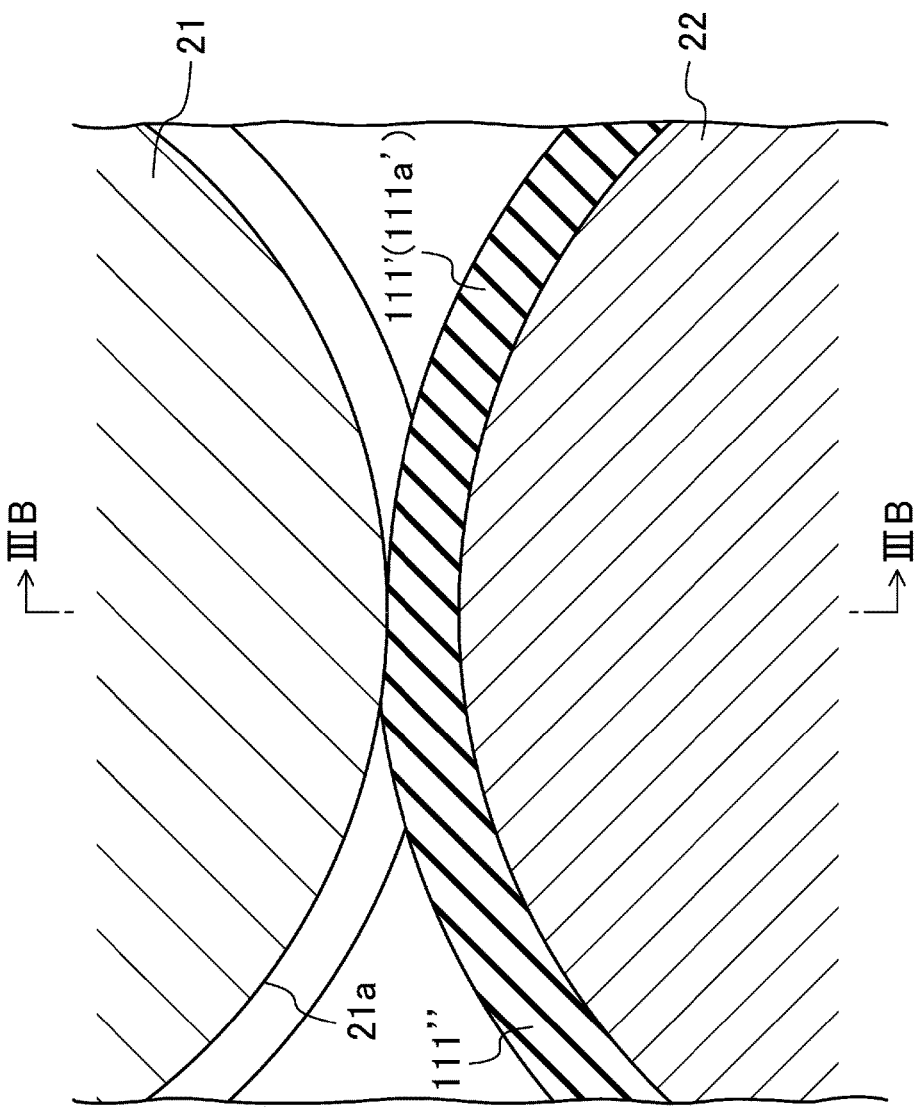

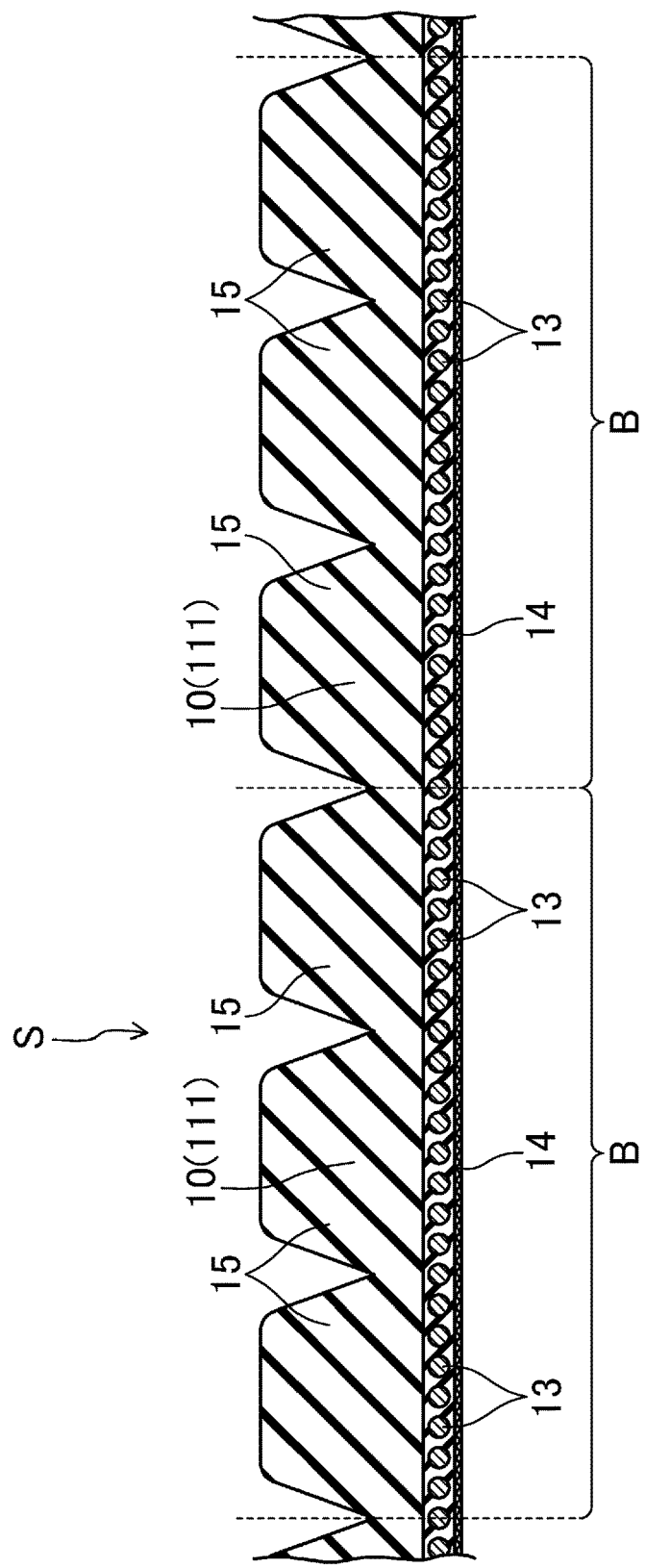

METHOD FOR PRODUCING BELT, AND CYLINDRICAL MOLD AND CROSSLINKING APPARATUS USED THEREFOR

CROSS-REFERENCE TO RELATED APPLICATIONS

This is a continuation of International Application No. PCT/JP2017/000309 filed on Jan. 6, 2017, which claims priority to Japanese Patent Application No. 2016-069531 filed on Mar. 30, 2016. The entire disclosures of these applications are incorporated by reference herein.

BACKGROUND

The present disclosure relates to a method for producing a belt such as a V-ribbed belt, a V-belt, a toothed belt, and a flat belt. The present disclosure also relates to a cylindrical mold and a crosslinking apparatus for use in such a production method.

Methods for producing belts having V-shaped ribs of this type have been known. For example, Japanese Patent No. 5156881 discloses, as one of the methods, a vulcanization molding method using a cylindrical inner mold and a cylindrical outer mold provided concentrically with each other. The inner mold is made of a flexible material such as rubber, whereas the outer mold is made of a rigid material such as metal. The inner peripheral surface of the outer mold functions as a molding surface and has V-shaped rib formation grooves arranged at regular pitches in the axial direction of the outer mold. The outer mold is provided with a temperature control mechanism which controls a temperature by allowing passage of a heating medium such as water vapor, or a cooling medium such as water. A layered structure including materials stacked together is formed on a rubber sleeve. The rubber sleeve having the layered structure formed thereon is then fitted inside the outer mold so as to be positioned adjacent to the inner peripheral surface of the outer mold. The inner mold is then inflated, thereby carrying our pressurization and heating concurrently.

SUMMARY

The known outer mold has a complicated structure due to inclusion of a temperature control mechanism which allows a heating or cooling medium to flow inside the outer mold. Processing to make the known outer mold requires significant time and incurs costs.

In addition, it is necessary to prepared different outer molds for different types of belts. If the processing is onerous, problems are caused both in terms of time and in terms of costs.

In view of the foregoing problems, it is therefore an object of the present disclosure to enable heating and molding of a belt with a simple mold.

To achieve the object described above, the present disclosure provides a method for producing a belt. The method includes:

providing a cylindrical mold made of metal, a shaped structure having a cylindrical shape, a rotation mechanism configured to rotatably support the cylindrical mold, and an electromagnetic induction coil configured to heat the cylindrical mold through electromagnetic induction;

setting the shaped structure inside the cylindrical mold; and molding a cylindrical belt slab by heating the cylindrical mold by the electromagnetic induction coil, while the cylindrical mold is rotated by the rotation mechanism and the shaped structure is pressurized from inside.

With this configuration, the cylindrical mold needs to include neither a jacket provided therein for allowing heating or cooling medium to flow, nor a pipe for such a jacket. The cylindrical mold can be heated by simply allowing a current to flow through the electromagnetic induction coil. This contributes to simplification of the system. Further, since no channel for a heating or cooling medium is provided, the cylindrical mold has a simple shape. This makes it easy for the electromagnetic induction coil to heat the shaped structure uniformly.

The electromagnetic induction coil may include a plurality of electromagnetic induction coils, and the plurality of electromagnetic induction coils may heat, in an overlapping manner, at least one identical portion of the outer periphery of the cylindrical mold. This configuration makes it possible to heat the entire cylindrical mold as uniformly as possible, substantially without leaving any region insufficiently heated by the electromagnetic induction coils.

The electromagnetic induction coil or at least one of the electromagnetic induction coils has an end positioned above or below an associated one of axial ends of the cylindrical mold, and heats the associated one of the axial ends. With this configuration, the axial end portion of the cylindrical mold is easily maintained at substantially the same temperature as the rest of the cylindrical mold.

A temperature of the entire outer periphery of the cylindrical mold may be adjusted through control of a current or a voltage of each of the electromagnetic induction coils based on information provided by a plurality of temperature sensors arranged around the cylindrical mold. In this configuration, the electromagnetic induction coils can be respectively controlled in accordance with the actual temperatures of the cylindrical mold detected by the temperature sensors, thereby further ensuring that the entire cylindrical mold is at a uniform temperature.

The shaped structure may be pressed against the cylindrical mold through expansion of an expansion sleeve arranged inside the shaped structure, the expansion achieved by introducing a fluid into the expansion sleeve. As a result, the cylindrical mold that is uniformly heated presses the shaped structure with a uniform pressure and reliably heats the shaped structure, thereby producing a belt slab with efficiency. Non-limiting examples of the fluid include air, nitrogen, vapor, superheated vapor, and oil.

After having been heated, the cylindrical mold may be cooled through direct ejection of cooling water to the outer periphery of the cylindrical mold. This configuration enables the cylindrical mold on the rotation mechanism to be cooled, without having to remove the cylindrical mold from the rotation mechanism, increasing efficiency in production.

The rotation mechanism may support the cylindrical mold through point contact at three or more points. This configuration substantially prevents heat transferred to the cylindrical mold from being transmitted to other components, and achieves substantially uniform heat transfer to the mold.

The cylindrical mold may include neither a pipe nor a fluid channel for allowing passage of vapor for heating or water for cooling. For example, the cylindrical mold may be configured as a mold which is substantially cylindrical except a transport groove, which is devoid of upper and lower flange portions, a reinforcing beam, a pipe, a fluid channel, which includes V-shaped, cog-shaped, or tooth-shaped grooves formed on the inner surface, and which is comprised of the cylindrical body as its only metal portion with a large thermal capacity. If necessary, the cylindrical mold may have a cylindrical body which is symmetric with respect to its vertical center. The thus configured cylindrical mold, which has a very simple shape having substantially no unevenness in the peripheral direction, is easy to heat more uniformly.

A recessed groove may be formed in at least one of axial end portions of an outer peripheral surface of the cylindrical mold. Formation of the recessed groove results in a decrease in the cross-sectional area, reducing heat transfer to the respective end portion. A transport hook may be attached to the recessed groove. This eliminates the need for forming another recessed groove or the like for the transportation, reducing the processing costs.

The cylindrical mold may be made of a single metal material. The thus configured cylindrical mold has a very simple structure and is easy to heat uniformly.

Further, a crosslinking apparatus for use in the method for producing a belt may include the cylindrical mold made of metal, the rotation mechanism configured to rotatably support the cylindrical mold, and the electromagnetic induction coil configured to heat the cylindrical mold through electromagnetic induction. The rotation mechanism may include a plurality of support projections which reduce a contact area between the rotation mechanism and the cylindrical mold. This configuration can reduce heat transfer toward the rotation mechanism.

The electromagnetic induction coil may include a plurality of electromagnetic induction coils. The electromagnetic induction coils may be arranged at a plurality of different vertical levels, and adjacent ones of the electromagnetic induction coils may be displaced from each other in a circumferential direction. By adopting this arrangement, even if the electromagnetic induction coils are in such shapes and sizes that they partially in contact with each other when arranged in vertical direction, the electromagnetic induction coils can be arranged without being contact with each other and spaced apart from the cylindrical mold by the same gap.

Further, each of the plurality of electromagnetic induction coils may be comprised of a rectangular coil. A single cylindrical coil is not equipped for cylindrical molds having different diameters. However, the same set of rectangular coils is equipped for cylindrical molds having different outer diameters.

According to the present disclosure, the cylindrical belt slab is heated by the electromagnetic induction coil, while being pressed onto the inner surface of the metal cylindrical mold. This configuration eliminates the need for causing a heating or cooling medium to flow through the inside the cylindrical mold, and the belt slab can be heated and molded with the cylindrical mold that has a simple structure.

BRIEF DESCRIPTION OF THE DRAWINGS

FIG. 1 is a perspective view of a V-ribbed belt produced by a first production method according to an embodiment.

FIG. 2 is a perspective view of a core rubber sheet for use in the first production method.

FIG. 3A shows how a core rubber layer-forming portion is produced in a component preparation step of the first production method.

FIG. 7 shows a finishing step of the first production method.

DETAILED DESCRIPTION

Figure 3B:
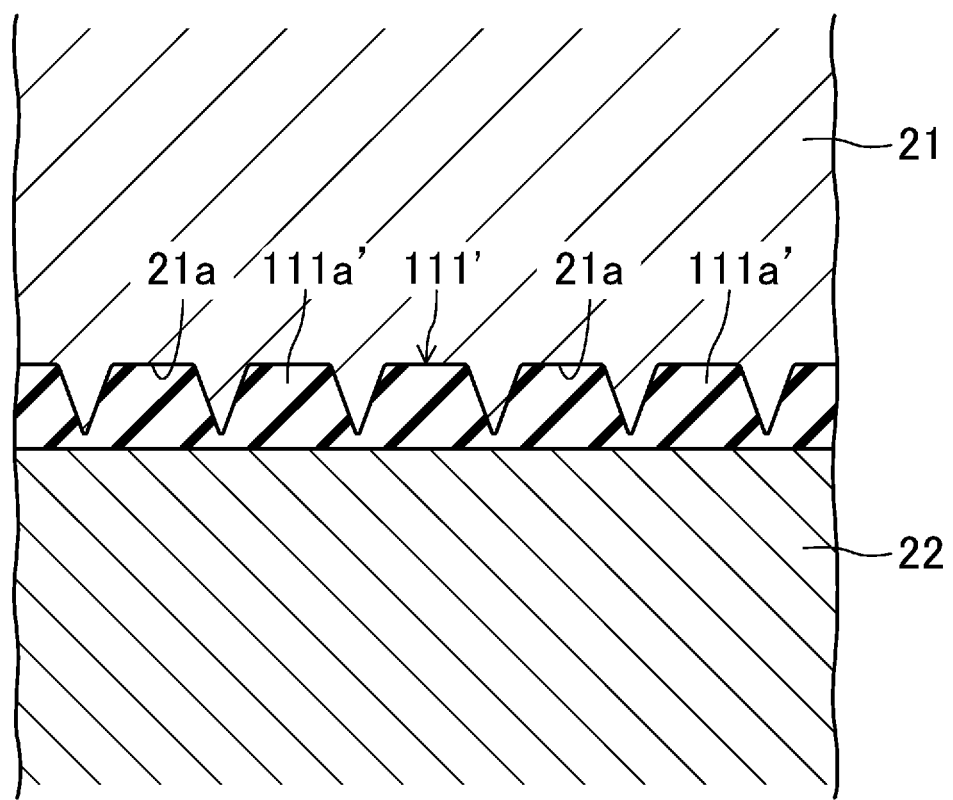
FIG. 3B is a cross-sectional view taken along line IIIB-IIIB of FIG. 3A.

Embodiments will be described in detail below with reference to the drawings.

FIG. 1 shows a V-ribbed belt B produced by a production method according to an embodiment. The V-ribbed belt B is usable as a power transmission member for various machines. For example, the V-ribbed belt B has a length of 700 mm to 3000 mm, a width of 10 mm to 36 mm, and a thickness of 4.0 mm to 5.0 mm.

The V-ribbed belt B of this embodiment is comprised of a rubber-made belt body 10 including a core rubber layer 111 which forms an inner peripheral portion of the belt B and an adhesive rubber layer 12 which forms an outer peripheral portion of the belt B1. The inner and outer peripheral portions face each other in the thickness direction of the belt B. The core rubber layer 111 constitutes a compressed rubber layer 11 including, on the inner peripheral side in the thickness direction, a plurality of V-shaped ribs 15 which extend in the longitudinal direction and are arranged in the belt width direction. The plurality of V-shaped ribs 15 forms a pulley contacting portion. The core rubber layer 111 may be covered with a surface rubber layer or surface canvas. A cord 13 is embedded in a middle portion, in the thickness direction, of the adhesive rubber layer 12. The cord 13 forms, in the adhesive rubber layer 12, a helical pattern having pitches in the width direction. A reinforcing fabric 14 is attached to the outer peripheral side of the adhesive rubber layer 12, i.e., the back face of the belt. Note that the V-ribbed belt B may include a stretch rubber layer instead of the reinforcing fabric 14. Thus, the rubber-made belt body may include the compressed rubber layer, the adhesive rubber layer, and the stretch rubber layer.

The plurality of V-shaped ribs 15 are each in the shape of a ridge extending in the belt length direction and having an approximately inverted triangular cross section. The V-shaped ribs 15 are arranged parallel to one another in the belt width direction. Each V-shaped rib 15 has, for example, a height of 2.0 mm to 3.0 mm, and a width of 1.0 mm to 3.6 mm at the rib base end. The number of the ribs ranges, for example, from 3 to 6 (3 ribs in FIG. 1).

The core rubber layer 111 is made of a rubber composition which is produced by crosslinking, through heating and pressurization, an uncrosslinked rubber composition prepared by kneading a rubber component and various compound ingredients together. Examples of the rubber component include ethylene-α-olefin elastomer (such as EPDM and EPR), chloroprene rubber (CR), chlorosulfonated polyethylene rubber (CSM), and hydrogenated acrylonitrile-butadiene rubber (H-NBR). One of these substances or a blend of two or more of these substances is suitably used as the rubber component. Examples of the compound ingredients include a reinforcing material (such as carbon black), a filler, a plasticizer, a processing aid, a crosslinking agent, a co-crosslinking agent, a vulcanization accelerator, a vulcanization accelerator aid, and an antioxidant.

The cord 13 is made of a twisted yarn of fibers, such as polyester fibers, polyethylene naphthalate fibers, aramid fibers, and vinylon fibers. The cord 13 has undergone an adhesion treatment to be adhesive to the adhesive rubber layer 12 of the belt body 10.

The reinforcing fabric 14 is comprised of a woven, knitted, or unwoven fabric made of nylon fibers, polyester fibers, aramid fibers, or cotton, for example. The reinforcing fabric 14 has undergone an adhesion treatment to be adhesive to the adhesive rubber layer 12 of the belt body 10.

(First Production Method)

A first production method of the V-ribbed belt B according to this embodiment will be described with reference to FIGS. 2 to 7.

The first production method includes a component preparation step, a shaping step, a crosslinking step, and a finishing step.

<Component Preparation Step>

In the component preparation step, a core rubber sheet 111' which is to constitute a core rubber layer 111, an adhesive rubber sheet 12' which is to constitute an adhesive rubber layer 12, a cord 13', and a reinforcing fabric 14' are prepared.

—Core Rubber Sheet 111'—

A rubber component and compound ingredients are kneaded together by using a kneading machine such as a kneader or a Banbury mixer to obtain an uncrosslinked rubber composition. The uncrosslinked rubber composition is molded by calender molding or the like, into a thick uncrosslinked rubber sheet 111" (shown in FIG. 3A only). The core rubber sheet 111' is then prepared from the uncrosslinked rubber sheet 111". The core rubber sheet 111' has, on one of the surfaces, a plurality of core rubber layer-forming portions 111a', as compressed rubber layer-forming portions, which are each comprised of a linearly-extending ridge and which extend parallel to, and adjacent to, each other. The plurality of core rubber layer-forming portions 111a' have the same shape. Each core rubber layer-forming portion 111a' has a width decreasing toward its distal end. Specifically, each core rubber layer-forming portion 111a' is shaped to have a cross section in an isosceles trapezoidal shape. The core rubber sheet 111' can be prepared in the following manner. As shown in FIGS. 3A and 3B, the uncrosslinked rubber sheet 111" is passed between a flat roll 22 and a core rubber-shaping roll 21 having trapezoidal grooves 21a that have a shape corresponding to the shape of the core rubber layer-forming portions 111a' of the core rubber sheet 111', extend in the circumferential direction, and are arranged adjacent to each other in the axial direction of the core rubber-shaping roll 21. In this manner, the trapezoidal grooves 21a on the outer peripheral surface of the core rubber-shaping roll 21 are pressed onto one of the surfaces of the uncrosslinked rubber sheet 111", thereby forming the core rubber layer-forming portions 111a'. The core rubber sheet 111' can also be prepared by press molding or extrusion molding. If the method is applied to production of a flat belt or the like, the shape of the core rubber sheet 111' may remain the same as the shape of the uncrosslinked rubber sheet 111", which is flat.

—Adhesive Rubber Sheet 12'—

A rubber component and compound ingredients are kneaded together by using a kneading machine such as kneader or a Banbury mixer to obtain an uncrosslinked rubber composition. The uncrosslinked rubber composition is molded by calender molding or the like, into a sheet, i.e., the adhesive rubber sheet 12'.

—Cord 13'—

A twisted yarn to form a cord 13' undergoes an adhesion treatment in which the twisted yarn is soaked in an RFL aqueous solution and heated, and/or an adhesion treatment in which the twisted yarn is soaked in rubber cement and dried. The twisted yarn may undergo, prior to these adhesion treatments, a base treatment in which the twisted yarn is soaked in an epoxy resin solution or an isocyanate resin solution and heated.

—Reinforcing Fabric 14'—

A woven fabric or a fabric of any other type which is to constitute a reinforcing fabric 14 undergoes one kind or two or more kinds of the following treatments: an adhesion treatment in which the fabric is soaked in an RFL aqueous solution and heated; an adhesion treatment in which the fabric is soaked in rubber cement and dried; and an adhesion treatment in which rubber cement is applied to a surface of the fabric to face the belt body 10 and dried. The twisted yarn may undergo, prior to these adhesion treatments, a base treatment in which the twisted yarn is soaked in an epoxy resin solution or an isocyanate resin solution and heated. In the case where a stretch rubber layer is provided instead of the reinforcing fabric 14, a stretch rubber sheet to constitute the stretch rubber layer is prepared in a manner similar to that for the adhesive rubber sheet 12'.

<Shaping Step>

Figure 4A:
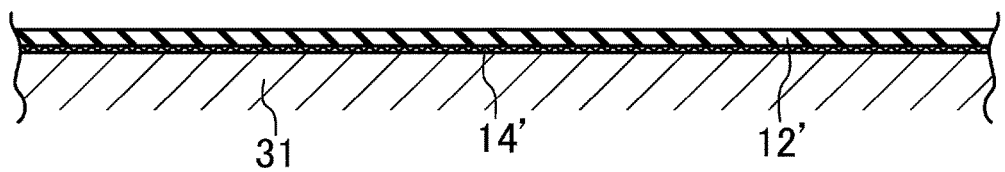
FIG. 4A is a first drawing showing a shaping step of the first production method.

In the shaping step, first, a shaping mandrel 31 having a cylindrical shape is rotatably supported on a shaft of a shaping machine (not shown) such that the axis of the shaping mandrel 31 extends horizontally. As shown in FIG. 4A, a reinforcing fabric 14' is wrapped around the shaping mandrel 31, and then, the adhesive rubber sheet 12' is wrapped around the reinforcing fabric 14'. The shaping mandrel 31 is chosen so as to correspond to the length of the V-ribbed belt B to be produced. In this step, the adhesive rubber sheet 12' is stacked on the reinforcing fabric 14'. In the case of providing a stretch rubber layer, a stretch rubber sheet is used instead of the reinforcing fabric 14', and the shaping step is carried out in a similar manner.

Figure 4B:
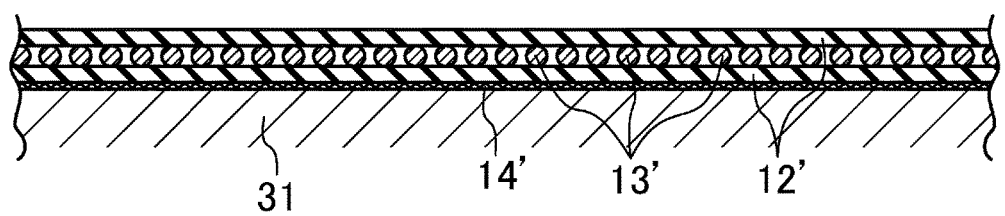
FIG. 4B is a second drawing showing the shaping step of the first production method.

Subsequently, as shown in FIG. 4B, a cord 13' is helically wound around the adhesive rubber sheet 12'. Another adhesive rubber sheet 12' is then wrapped over the wound cord 13'. At this time, a layer of the cord 13' is stacked on the adhesive rubber sheet 12', and the other adhesive rubber sheet 12' is stacked on the layer of the cord 13'.

Figure 4C:
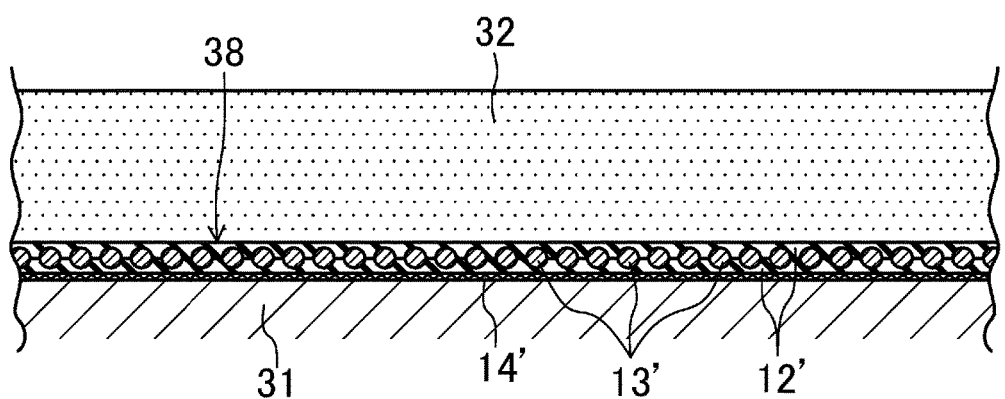
FIG. 4C is a third drawing showing the shaping step of the first production method.

Next, as shown in FIG. 4C, the entre periphery of the adhesive rubber sheet 12' is pressed with a roller 32. At this time, the rubber flows enters between turns of the cord 13', and the cord 13' is embedded between the pair of adhesive rubber sheets 12' so as to be fixed in position. As a result, these components are all integrated into a cylindrical tensile member 38.

Figure 4D:
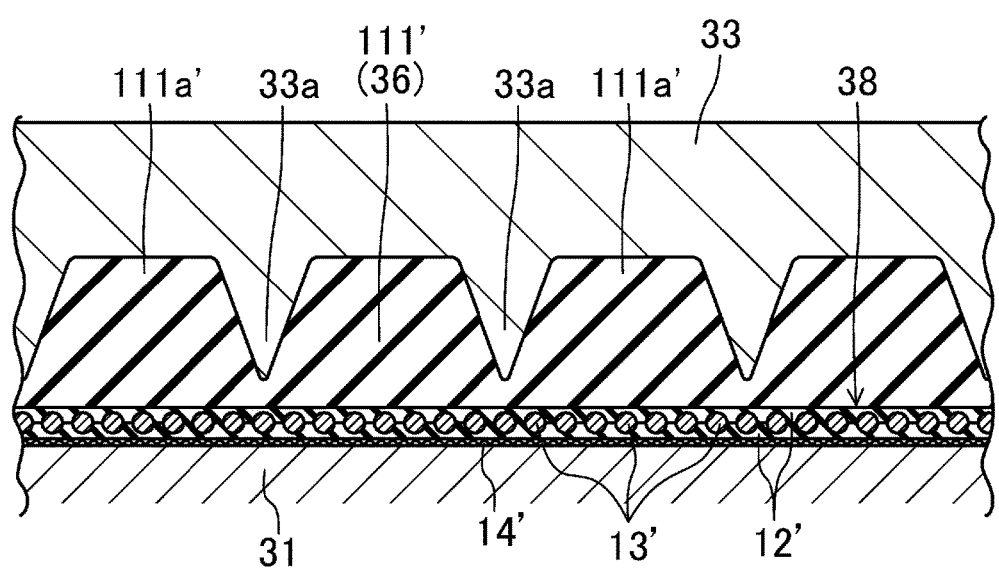
FIG. 4D is a fourth drawing showing the shaping step of the first production method.

Next, as shown in FIG. 4D, the core rubber sheet 111' is wrapped around the adhesive rubber sheet 12' of the tensile member 38 such that the core rubber layer-forming portions 111a' face outside and extend in the circumferential direction. At this time, a comb-shaped guide 33 having a shape corresponding to the core rubber layer-forming portions 111a' of the core rubber sheet 111' is set outside the shaping mandrel 31 such that the guide 33 extends in the axial direction and comb teeth 33a of the guide 33 face the shaping mandrel 31. Each of the core rubber layer-forming portions 111a' of the core rubber sheet 111' is guided between an associated pair of the comb teeth 33a, and the core rubber sheet 111' is wrapped around, and stacked on, the adhesive rubber sheet 12' with the core rubber layer-forming portions 111a' extending in the circumferential direction with precision.

In the manner described above, an uncrosslinked slab S' having a cylindrical shape is formed on the shaping mandrel 31. The uncrosslinked slab S' includes the reinforcing fabric 14', the adhesive rubber sheet 12', the cord 13', the other adhesive rubber sheet 12', and the core rubber sheet 111' that are sequentially stacked toward the outside. The uncrosslinked slab S' includes the core rubber sheet 111' formed into a cylindrical shape, i.e., a shaped structure 36 which has a cylindrical shape. The shaped structure 36 is made of the uncrosslinked rubber composition and has, on its outer peripheral surface, the core rubber layer-forming portions 111a' that are comprised of the plurality of ridges extending in the circumferential direction and that are arranged adjacent to each other in the axial direction. The number of the core rubber layer-forming portions 111a' included in the uncrosslinked slab S' is 20 to 100, for example.

If the method is applied to production of a flat belt or the like, the uncrosslinked slab S' is suitably formed using a flat core rubber sheet 111'.

<Crosslinking Step>

Figure 5A:
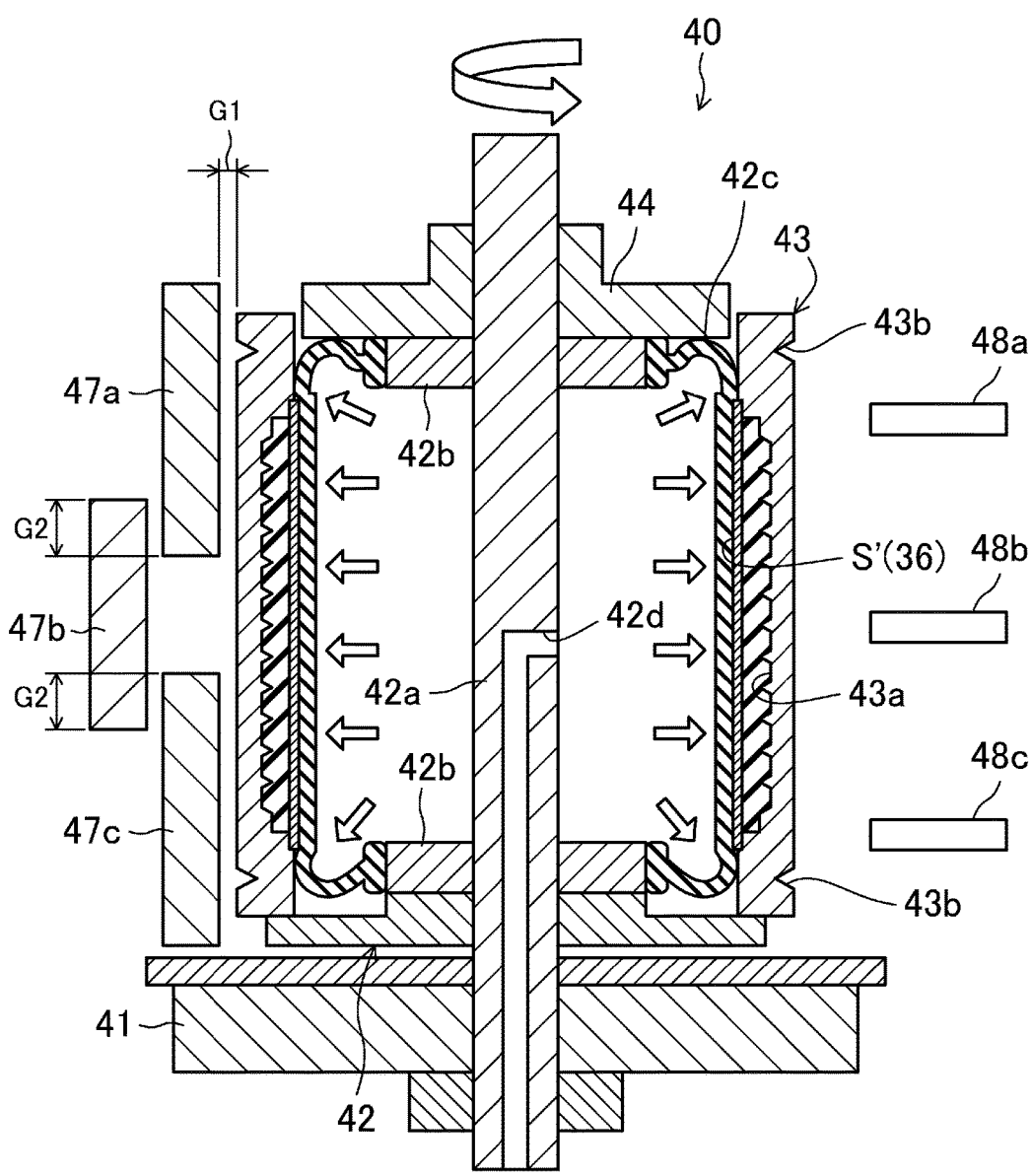
FIG. 5A is a cross-sectional view of a crosslinking apparatus.
Figure 5B:
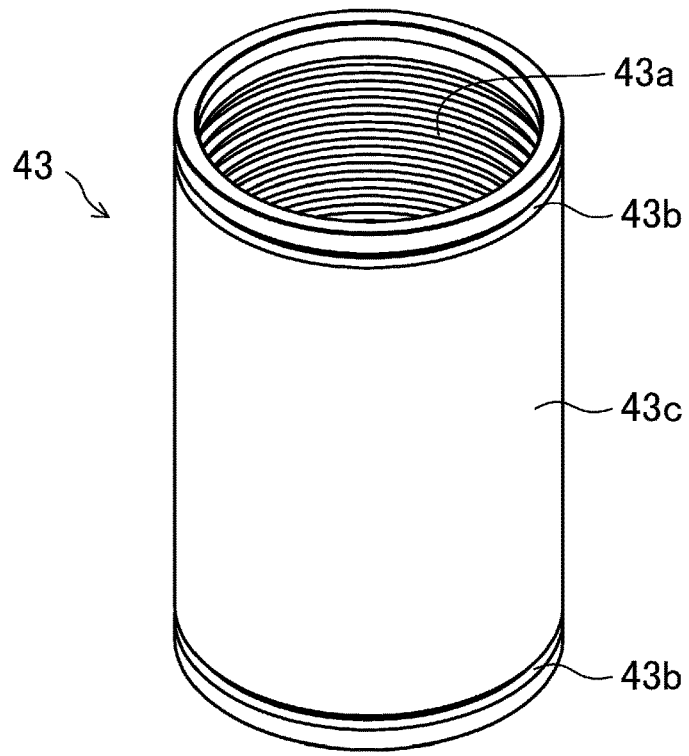
FIG. 5B is a perspective view showing an exemplary cylindrical mold.

FIGS. 5A and 5B show a crosslinking apparatus 40 for use in the crosslinking step.

The crosslinking apparatus 40 includes a rotary table 41 as a rotation mechanism, a columnar expansion drum 42 standing on the rotary table 41, and a cylindrical mold 43 provided outside the expansion drum 42. The rotation mechanism does not have to include the disc-shaped rotary table 41.

The expansion drum 42 includes a rotation shaft 42a coupled to the rotary table 41, and upper and lower fixing rings 42b respectively coupled to upper and lower portions of the rotation shaft 42a such that the fixing rings 42b rotate together with the rotation shaft 42a. The upper and lower fixing rings 42b are hermetically coupled to upper and lower ends of a rubber-made cylindrical expansion sleeve 42c, respectively. The rotation shaft 42a can be rotated, together with the rotary table 41, at a predetermined speed by a motor (not shown). The rotation shaft 42a has, in its peripheral wall, a large number of passage holes 42d communicating with the inside. Note that the drawing shows only one of the passage holes 42d. The crosslinking apparatus 40 includes a pressurizing means (not shown) such as a compressor for applying a pressure by introducing a high-pressure fluid into the rotation shaft 42a. The high-pressure fluid introduced into the rotation shaft 42a by the pressurizing means passes through the passage holes 42d to enter the space between the rotation shaft 42a and the expansion sleeve 42c, and inflates the expansion sleeve 42c radially outward. Non-limiting examples of the fluid include air, nitrogen, vapor, superheated vapor, and oil. In this embodiment, air is used as the fluid.

The cylindrical mold 43 is attachable to, and detachable from, the rotary table 41. The cylindrical mold 43 is attached to the rotary table 41 such that the cylindrical mold 43 and the expansion drum 42 are arranged concentrically with each other with a space interposed therebetween. Although not shown, a plurality of support projections may be provided on the rotary table 41 so as to reduce the contact area between the rotary table 41 and the cylindrical mold 43. This configuration reduces heat transferred to the rotary table 41.

Figure 5C:
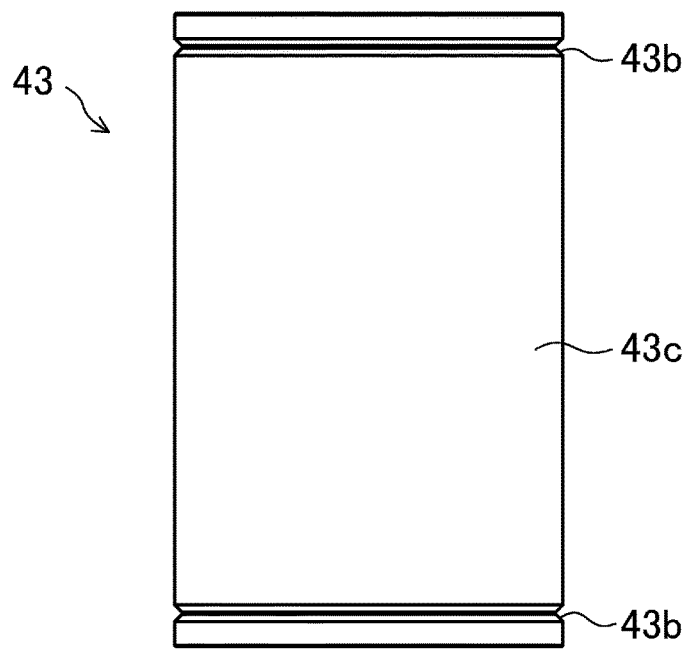
FIG. 5C is a front view showing the exemplary cylindrical mold.
Figure 5D:
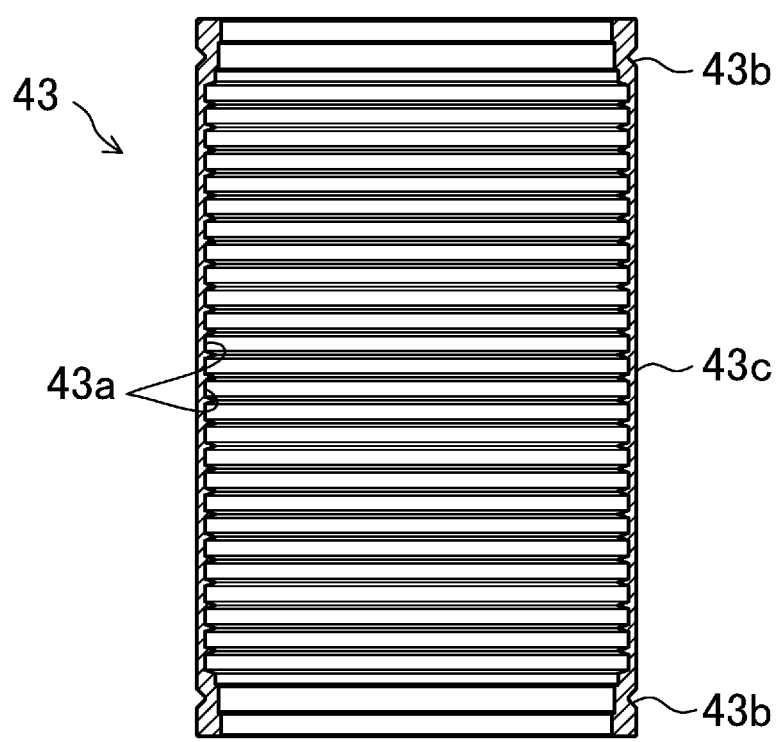
FIG. 5D is a cross-sectional view showing the exemplary cylindrical mold.

As can be seen from the non-limiting example shown in FIGS. 5B to 5D, the cylindrical mold 43 has, on its inner peripheral surface, a plurality of compressed rubber layer-shaping grooves 43a which each extend in the circumferential direction and which are arranged adjacent to each other in the axial direction (in a groove width direction). Each compressed rubber layer-shaping groove 43a tapers toward its groove bottom. Specifically, each compressed rubber layer-shaping groove 43a has the same isosceles trapezoidal cross section as the core rubber layer 111 of the V-ribbed belt B to be produced. The size of the compressed rubber layer-shaping groove 43a is determined in accordance with the specification of a V-ribbed belt B or a V-belt to be produced.

For example, the cylindrical mold 43 is produced by cutting a single metal material such as cylindrical steel pipe. The cylindrical mold 43 produced in this manner has a very simple structure and is easy to heat uniformly. Further, an easily-available and inexpensive material can be used, and low processing costs are incurred. A recessed groove 43b is formed in each of the axial end portions of the outer peripheral surface of the cylindrical mold 43. Only one recessed groove 43b may be formed at the upper end portion. Formation of the recessed groove 43b results in a decrease in the cross-sectional area, reducing heat transfer to the respective end portion. A transport hook may be attached to the recessed groove 43b. This eliminates the need for forming another recessed groove 43b or the like for the transportation, reducing the processing costs. The cylindrical mold 43 has compressed rubber layer-shaping grooves 43a formed in a vertically intermediate portion of the inner peripheral surface. The outer peripheral surface corresponding to the region where the compressed rubber layer-shaping grooves 43a are formed constitutes an even surface 43c. In other words, the cylindrical mold 43 includes neither a pipe nor fluid channel for allowing passage of vapor for heating or water for cooling, and has a simple cylindrical shape which is symmetrical with respect to its vertical center. Thus configured cylindrical mold 43, which has a very simple shape having substantially no unevenness in the peripheral direction, is easy to heat further uniformly.

As shown in FIG. 5A, the crosslinking apparatus 40 is provided with electromagnetic induction coils 47a, 47b, and 47c which are configured to heat the cylindrical mold 43 by electromagnetic induction, and arranged with a predetermined gap G1 interposed between the cylindrical mold 43 and the coils. For example, each of the electromagnetic induction coils 47a, 47b, and 47c of this embodiment is configured as a rectangular coil of a ferrite core resin molding. Since the coils are rectangular coils, the same set of the coils is equipped for different cylindrical molds 43 having different outer diameters. A cylindrical coil is not equipped for different cylindrical molds 43 having different diameters. For the sake of illustration, the electromagnetic induction coil 47b at a vertical center in FIG. 5A is shown to be located outside relative to the upper and lower electromagnetic induction coils 47a and 47c. However, actually, the electromagnetic induction coil 47b is displaced from the upper and lower electromagnetic induction coils 47a and 47c in the circumferential direction and is spaced apart from the even outer peripheral surface of the cylindrical mold 43 by the gap G1, just like the coils 47a and 47c. G1 is set to be 5 mm, for example.

The number of the electromagnetic induction coils 47a, 47b, and 47c is not limited to any particular number. In general, the cylindrical mold 43 is designed to have an appropriately large height to increase the production efficiency, and depending on the height of the cylindrical mold 43, for example, three electromagnetic induction coils are provided as shown in FIG. 5A. It is suitable to arrange the electromagnetic induction coils 47a, 47b, and 47c such that the electromagnetic induction coils heat, in an overlapping manner, at least one identical area G2 of the outer periphery of the cylindrical mold 43. This configuration makes it possible to heat the entire cylindrical mold 43 as uniformly as possible, substantially without leaving any region insufficiently heated by the electromagnetic induction coils 47a, 47b, and 47c. Specifically, for example, since the electromagnetic induction coils 47a, 47b, and 47c are each made of a ferrite core resin molding, each electromagnetic induction coil has low energy portions near its upper and lower ends. Uniform heating is achieved by overlapping these low energy portions each other. In particular, the upper and lower electromagnetic induction coils 47a and 47c each have one end positioned beyond an associated one of the axial ends of the cylindrical mold 43. The upper electromagnetic induction coil 47a, which has its upper end positioned above the upper axial end of the cylindrical mold 43, heats an upper axial end portion of the cylindrical mold 43, while the lower electromagnetic induction coil 47c, which has its lower end positioned below the lower axial end of the cylindrical mold 43, heats a lower axial end portion of the cylindrical mold 43. This configuration has a merit: the axial end portions of the cylindrical mold 43 are easily maintained at substantially the same temperature as the rest of the cylindrical mold 43.

Further, a plurality of temperature sensors 48a, 48b, and 48c are provided around the cylindrical mold 43. The temperature of the entire outer periphery of the cylindrical mold 43 is adjusted by controlling a current or a voltage of each of the electromagnetic induction coils 47a, 47b, and 47c based on information provided by the temperature sensors 48a, 48b, and 48c. For example, the upper-side temperature sensor 48a is provided adjacent to the recessed groove 43b, the central temperature sensor 48b is provided near the vertical center, and the lower-side temperature sensor 48c is provided adjacent to the lower recessed groove 43b. In this configuration, the electromagnetic induction coils 47a, 47b, and 47c can be respectively controlled in accordance with the actual temperatures of the cylindrical mold 43 detected by the temperature sensors 48a, 48b, and 48c, thereby further ensuring that the entire cylindrical mold 43 is at uniform temperature. The arrangement of the temperature sensors 48a, 48b, and 48c is carefully determined so that in particular, temperature variation in the upper and lower end portions with a small cross-sectional area can be addressed easily. Providing the three temperature sensors 48a, 48b, and 48c for the three electromagnetic induction coils 47a, 47b, and 47c makes it easy to control the current or voltage of each of the electromagnetic induction coils 47a, 47b, and 47c.

Figure 6A:
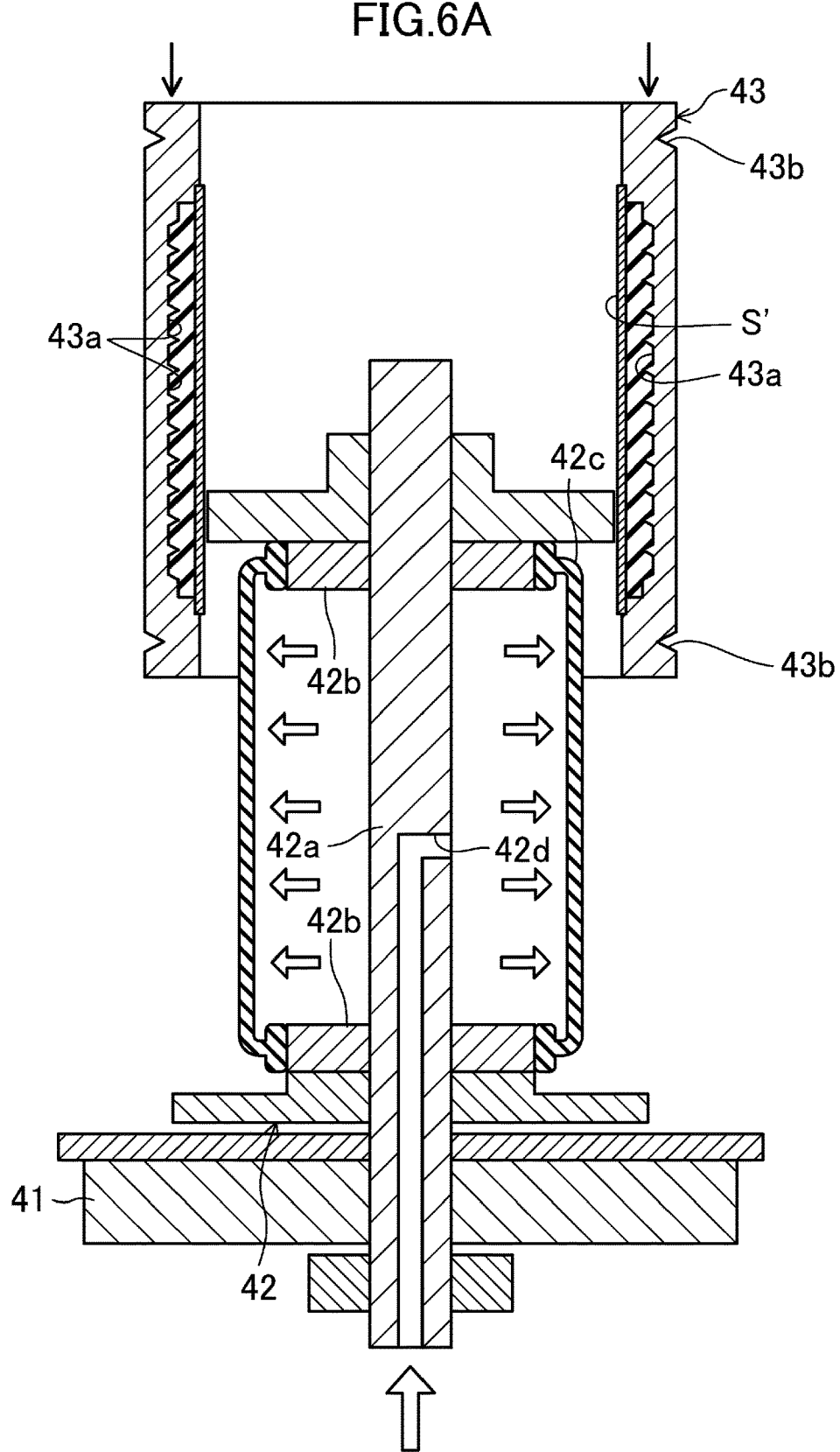
FIG. 6A is a first drawing showing a crosslinking step of the first production method.
Figure 6B:
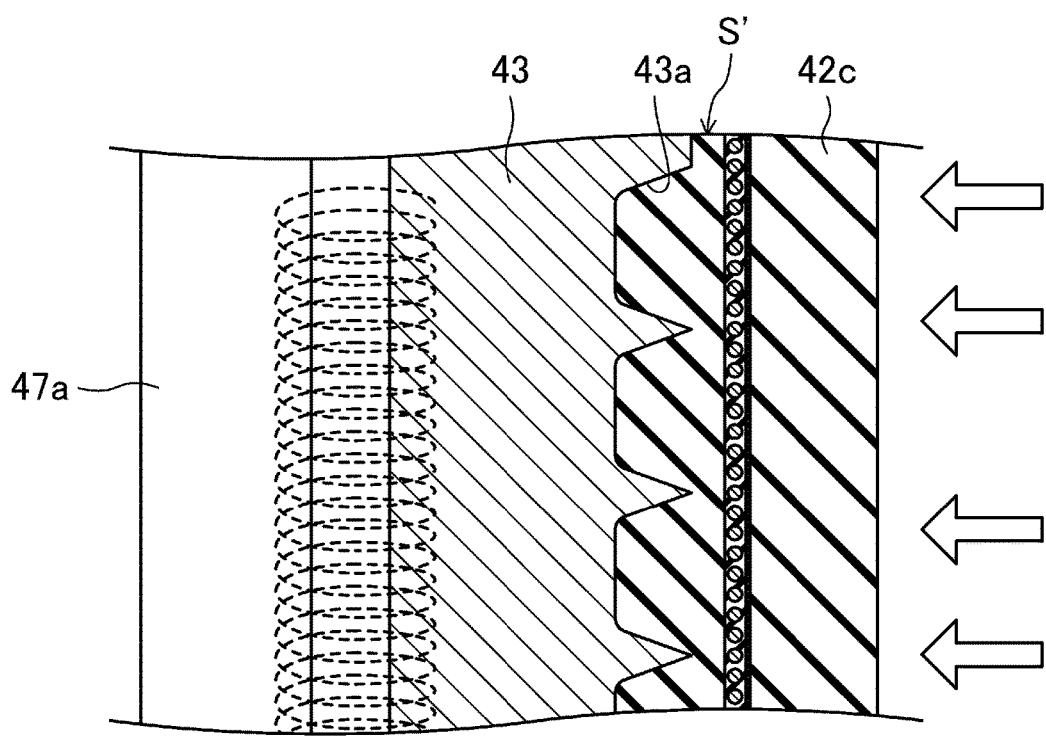
FIG. 6B is a second drawing showing the crosslinking step of the first production method.
Figure 6C:
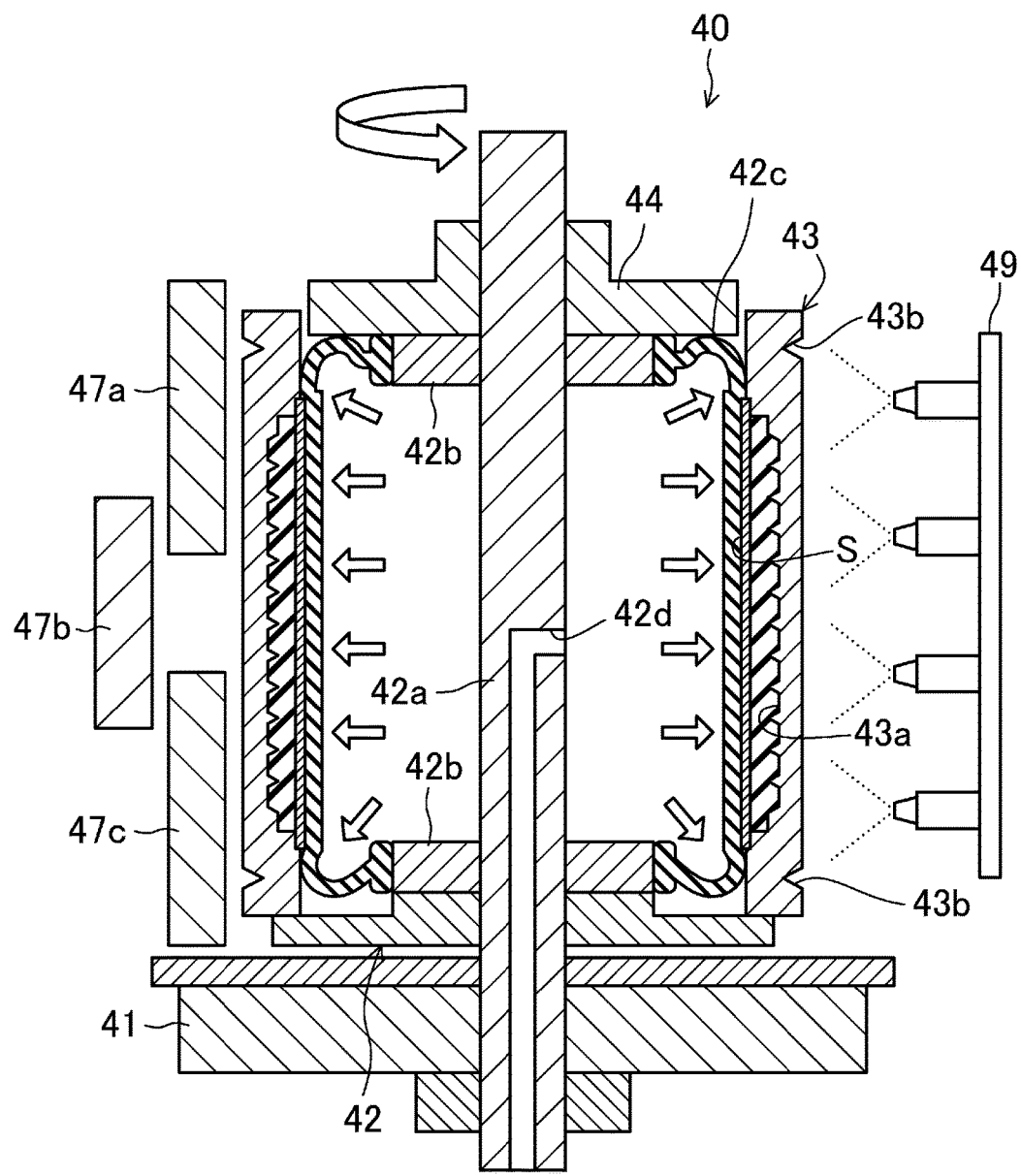
FIG. 6C is a third drawing showing the crosslinking step of the first production method.

Further, as shown in FIG. 6C, the crosslinking apparatus 40 is provided with a plurality of cooling ejection nozzles 49 as a cooling means. For example, tap water, industrial water, or the like is supplied to the ejection nozzles 49. This configuration enables the cylindrical mold 43 on the rotary table 41 to be cooled, without having to remove the cylindrical mold 43 from the rotary table 41, increasing efficiency in production.

A step of crosslinking an uncrosslinked slab S' by using the crosslinking apparatus 40 will be specifically described.

First, the uncrosslinked slab S' is removed from the shaping mandrel 31, and then placed inside the cylindrical mold 43 of the crosslinking apparatus 40, which has been previously detached from the rotary table 41. More specifically, the uncrosslinked slab S' is set inside the cylindrical mold 43 such that each of the plurality of core rubber layer-forming portions 111a' of the uncrosslinked slab S' is fitted in an associated one of the compressed rubber layer-shaping grooves 43a. Fitting the core rubber layer-forming portions 111a' in the compressed rubber layer-shaping grooves 43a in advance reduces stretch of the rubber, thereby enabling production of a V-ribbed belt B having a stable structure. The cylindrical mold 43 is chosen to correspond to the length of the V-ribbed belt B to be produced. Note that short fibers, resin powder, or the like may be attached to the inner peripheral surface of the cylindrical mold 43 and/or the outer peripheral surface of the uncrosslinked slab S' in advance.

Subsequently, after a vacuum has been created in the expansion drum 42, the cylindrical mold 43 having the uncrosslinked slab S' set therein is attached to the rotary table 41 such that the cylindrical mold 43 covers the expansion drum 42.

Next, the vacuum in the expansion drum 42 is eliminated. At this time, as shown FIG. 6A, a clearance is created between the uncrosslinked slab S' set in the cylindrical mold 43 and the expansion drum 42.

Next, a high-pressure fluid is introduced into the expansion drum 42 to expand the expansion sleeve 42c. As shown in FIG. 6B, the expansion sleeve 42c presses the uncrosslinked slab S' having each of the core rubber layer-forming portions 111a' fitted in the associated one of the compressed rubber layer-shaping grooves 43a of the cylindrical mold 43.

Next, as shown in FIG. 5A, the rotary table 41 is rotated, and currents are caused to flow through the electromagnetic induction coils 47a, 47b, and 47c. In this manner the cylindrical mold 43 is heated for a predetermined period of time.

As shown in FIG. 6B, while having each of the core rubber layer-forming portions 111a' fitted in the associated one of the compressed rubber layer-shaping grooves 43a of the cylindrical mold 43, the uncrosslinked slab S' is heated by the cylindrical mold 43 and pressed against the cylindrical mold 43 by the expansion sleeve 42b coming into contact with the uncrosslinked slab S'. Thus, the rubber components in the core rubber sheet 111' and the adhesive rubber sheet 12' that re included in the uncrosslinked slab S' are crosslinked to be integrated with one another. As a result, a continuous structure of belt bodies 10 each including the compressed rubber layer 11 comprised of the core rubber layer 111 and the adhesive rubber layer 12 for a plurality of V-ribbed belts B is produced. At the same time, the rubber components adhere to, and are combined with, the cord 13' and the reinforcing fabric 14'. A cylindrical belt slab S is thus formed eventually. For example, the heating is carried out at a temperature of 100° C. to 180° C., the pressurization is carried out at a pressure of 0.5 MPa to 2.0 MPa, and the process continues for 10 minutes to 60 minutes.

<Finishing Step>

In the finishing step, the electromagnetic induction coils 47a, 47b, and 47c stop heating. After the electromagnetic induction coils 47a, 47b, and 47c are retracted, cooling water is ejected from the ejection nozzles 49 while the rotary table 41 is kept rotating, as shown in FIG. 6C.

Next, the rotation of the rotary table 41 is stopped. After the cooling water has been blown away, a vacuum is created in the expansion sleeve 42a again.

The cylindrical mold 43 is then detached from the rotary table 41, and the belt slab S formed inside the cylindrical mold 43 is removed.

As shown in FIG. 7, the belt slab S that has been removed from the cylindrical mold 43 is cut into ring-shaped pieces each having two or more of the plurality of core rubber layer-forming portions 111a' (three core rubber layer-forming portions 111a' in this embodiment). Each piece is turned inside out, thereby obtaining the V-ribbed belt B of this embodiment.

As can be seen, according to this embodiment, the shaped structure 36 is set inside the cylindrical mold 43 such that each of the core rubber layer-forming portions 111a', which are to constitute the compressed rubber layer 11 including the ridges of the shaped structure 36, is fitted in the associated one of the compressed rubber layer-shaping grooves 43a of the cylindrical mold 43. The cylindrical mold 43 having the shaped structure 36 in this state is heated while being rotated together with the rotary table 41, and the shaped structure 36 is pressed against the cylindrical mold 43. In this manner, the shaped structure 36 is crosslinked, thereby forming the belt slab having a cylindrical shape. Thus, the cylindrical mold 43 of this embodiment needs neither a jacket provided therein for allowing heating or cooling medium to flow, nor a pipe for such a jacket. The cylindrical mold 43 can be heated by simply allowing currents to flow through the electromagnetic induction coils 47a, 47b, and 47c. This contributes to simplification of the system. Further, since no channel for a heating or cooling medium is provided, the cylindrical mold 43 has a simple shape. This makes it easy for the electromagnetic induction coils 47a, 47b, and 47c to heat the shaped structure 36 uniformly.

In addition, the shaped structure 36 is pressed against the cylindrical mold 43 through expansion of the expansion sleeve 42c set inside the shaped structure 36, the expansion being achieved with a fluid that is introduced into the expansion sleeve 42c. As a result, the cylindrical mold 43 that is uniformly heated presses the shaped structure 36 with a uniform pressure and reliably heats the shaped structure 36, thereby crosslinking the belt slab S with efficiency.

Thus, according to the present disclosure, while being pressed onto the inner surface of the metal cylindrical mold 43, the cylindrical belt slab S is heated by the electromagnetic induction coils 47a, 47b, and 47c. This configuration eliminates the need for causing a heating or cooling medium to flow through the inside of the cylindrical mold 43, and the belt slab S can be crosslinked and molded with the cylindrical mold 43 that has a simple structure.

OTHER EMBODIMENTS

The above embodiments of the present disclosure may be configured as follows.

In the embodiment described above, in the finishing step, the belt slab S is cut into ring-shaped pieces each having three core rubber layer-forming portion 111a', and the each of the obtained pieces is turned inside out, thereby obtaining the V-ribbed belt B. However, the belt slab S may be cut into pieces each having one core rubber layer-forming portion 111a', and the each of the obtained pieces is turned inside out. In this manner, a raw edge V-belt can be obtained.

In the embodiment described above, the V-ribbed belt B and the raw edge V-belt have been described as examples. The present disclosure is not limited to these belts, and is also applicable to any other belts including, for example, a toothed belt and a flat belt. To produce a flat belt, a cylindrical mold having a flat inner peripheral surface without the compressed rubber layer-shaping grooves 43a is used. To produce a toothed belt, it is suitable to form compressed rubber layer-shaping grooves 43a corresponding to the teeth of the toothed belt.

In the embodiment described above, the shaped structure of the uncrosslinked slab, which has been made to adhere to the inner surface of the cylindrical mold 43, is pressurized and heated, thereby crosslinking the slab. Instead, a shaped structure including a thermoplastic elastomer and a cord stacked together may be made to adhere to the inner surface of the cylindrical mold 43, and heated and pressurized, thereby combining and integrating the layered structure.

The foregoing embodiments are merely preferable examples in nature, and are not intended to limit the scope, application, or uses of the present disclosure.

What is claimed is:

1. A method for producing a belt, the method comprising:
providing a cylindrical mold which is hollow, made of metal, and having a mold center axis that extends through the cylindrical mold between axial ends of the cylindrical mold, a shaped structure which is hollow, having a cylindrical shape, and having a structure center axis that extends through the shaped structure between axial ends of the shaped structure, a rotation mechanism that rotates about a mechanism center axis extending in a vertical direction and configured to rotatably support a lower end of the cylindrical mold, and an electromagnetic induction coil configured to heat the cylindrical mold through electromagnetic induction;
setting the shaped structure inside the cylindrical mold such that the structure center axis and the mold center axis extend in a same direction;
disposing the cylindrical mold having the shaped structure set therein on and concentrically with the rotation mechanism such that the mold center axis coincides with the mechanism center axis such that the structure center axis and the mold center axis extend in the vertical direction; and
molding a cylindrical belt slab by heating the cylindrical mold by the electromagnetic induction coil, while the cylindrical mold is rotated by the rotation mechanism and the shaped structure is pressurized from inside.

2. The method of claim 1, wherein
the electromagnetic induction coil includes a plurality of electromagnetic induction coils.

3. The method of claim 2, wherein
the electromagnetic induction coils heat, in an overlapping manner, at least one identical portion of an outer periphery of the cylindrical mold.

4. The method of claim 2, wherein
a temperature of an entire outer periphery of the cylindrical mold is adjusted through control of a current or a voltage of each of the electromagnetic induction coils based on information provided by a plurality of temperature sensors arranged around the cylindrical mold.

5. The method of claim 1, wherein
the electromagnetic induction coil or at least one of the electromagnetic induction coils has an end positioned beyond an associated one of axial ends of the cylindrical mold, and heats the associated one of the axial ends.

6. The method of claim 1, wherein
the shaped structure is pressed against the cylindrical mold through expansion of an expansion sleeve arranged inside the shaped structure, the expansion being achieved by introducing a fluid into the expansion sleeve.

7. A method for producing a belt, the method comprising:

providing a cylindrical mold which is hollow, made of metal, and having a mold center axis that extends through the cylindrical mold between axial ends of the cylindrical mold, a shaped structure which is hollow, having a cylindrical shape, and having a structure center axis that extends through the shaped structure between axial ends of the shaped structure, a rotation mechanism that rotates about a mechanism center axis extending in a vertical direction and configured to rotatably support a lower end of the cylindrical mold, and an electromagnetic induction coil configured to heat the cylindrical mold through electromagnetic induction;

setting the shaped structure inside the cylindrical mold, wherein the shaped structure and the cylindrical mold with the shaped structure set therein are disposed such that the mold center axis and the structure center axis are extending in the vertical direction; and molding a cylindrical belt slab by heating the cylindrical mold by the electromagnetic induction coil, while the cylindrical mold is rotated by the rotation mechanism and the shaped structure is pressurized from inside, wherein after having been heated, the cylindrical mold is cooled through direct ejection of cooling water to an outer periphery of the cylindrical mold.

8. A method for producing a belt, the method comprising:

providing a cylindrical mold which is hollow, made of metal, and having a mold center axis that extends through the cylindrical mold between axial ends of the cylindrical mold, a shaped structure which is hollow, having a cylindrical shape, and having a structure center axis that extends through the shaped structure between axial ends of the shaped structure, a rotation mechanism that rotates about a mechanism center axis extending in a vertical direction and configured to rotatably support a lower end of the cylindrical mold, and an electromagnetic induction coil configured to heat the cylindrical mold through electromagnetic induction;

setting the shaped structure inside the cylindrical mold, wherein the shaped structure and the cylindrical mold with the shaped structure set therein are disposed such that the mold center axis and the structure center axis are extending in the vertical direction;

causing the rotation mechanism to support the cylindrical mold with the shaped structure set therein through point contact at three or more points; and molding a cylindrical belt slab by heating the cylindrical mold by the electromagnetic induction coil, while the cylindrical mold is rotated by the rotation mechanism and the shaped structure is pressurized from inside.

9. A method for producing a belt, the method comprising:

providing a cylindrical mold which is hollow, made of metal, and having a mold center axis that extends through the cylindrical mold between axial ends of the cylindrical mold, a shaped structure which is hollow, having a cylindrical shape, and having a structure center axis that extends through the shaped structure between axial ends of the shaped structure, a rotation mechanism that rotates about a mechanism center axis extending in a vertical direction and configured to rotatably support a lower end of the cylindrical mold, and an electromagnetic induction coil configured to heat the cylindrical mold through electromagnetic induction;

setting the shaped structure inside the cylindrical mold such that the structure center axis and the mold center axis extend in a same direction;

disposing the cylindrical mold with the shaped structure set therein on the rotation mechanism such that the mold center axis and the structure center axis extend in the vertical direction; and molding a cylindrical belt slab by heating the cylindrical mold by the electromagnetic induction coil, while the cylindrical mold is rotated by the rotation mechanism and the shaped structure is pressurized from inside.

10. A method for producing a belt, the method comprising:

providing a cylindrical mold which is hollow, made of metal, and having a mold center axis that extends through the cylindrical mold between axial ends of the cylindrical mold, a shaped structure which is hollow, having a cylindrical shape, and having a structure center axis that extends through the shaped structure between axial ends of the shaped structure, a rotation mechanism that rotates about a mechanism center axis extending in a vertical direction and configured to rotatably support a lower end of the cylindrical mold, and an electromagnetic induction coil configured to heat the cylindrical mold through electromagnetic induction;

setting the shaped structure inside the cylindrical mold such that the structure center axis and the mold center axis extend in a same direction;

disposing the cylindrical mold having the shaped structure set therein on the rotation mechanism such that the mold center axis coincides with the mechanism center axis such that the structure center axis and the mold center axis extend in the vertical direction; and molding a cylindrical belt slab by heating the cylindrical mold by the electromagnetic induction coil, while the cylindrical mold is rotated about the mechanism center axis by the rotation mechanism and the shaped structure is pressurized from inside.

11. The method of claim 10, wherein the shaped structure is pressed against the cylindrical mold through expansion of an expansion sleeve arranged inside the shaped structure, the expansion being achieved by introducing a fluid into the expansion sleeve through a passage hole formed in a rotation shaft of the rotation mechanism.

\* \* \* \* \*